Patented Sept. 12, 1944

2,358,273

UNITED STATES PATENT OFFICE 2,358,273

ALKYL DIAMIDES OF AROMATIC DISULPHONIC ACIDS AND PRODUCTS TREATED THEREWITH

David Aelony, Dayton, Ohio, assignor to Monsanto Chemical Company, a corporation of Delaware No Drawing. Application September 8, 1941,
Serial No. 410,047

3 Claims. (Cl. 252—8.75)

This invention relates to new alkyl diamides of aromatic disulphonic acids, and to products treated therewith.

The present invention comprises compounds having the following general formula:

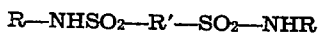

where R is a long chain aliphatic residue having a carbon chain length from $C_8$ to $C_{28}$ inclusive and R' is an aromatic residue such as phenylene, biphenylene, naphthylene, anthrylene, phenanthrylene, etc. and which aromatic residue may contain additional nuclear substituents.

Compounds of the general formula as given above are characterized by having pronounced hydrophobic properties. These compounds are also highly insoluble in water and in most organic solvents including chlorinated, organic solvents as are used in dry cleaning, etc.

They are also characterized by the property of readily forming dispersions in water solution which dispersions may be produced either mechanically or by combinations of mechanical and chemical processes, including the use of dispersing agents.

In the above general formula as stated, R may be a long chain aliphatic residue having a carbon chain length between the limits of $C_8$ to $C_{28}$ and may be derived from natural or synthetic products such as the natural oils, fats or waxes. For the purpose of the present invention I utilize such long chain aliphatic molecules in the form of their amines. Particularly I have found that octyl amine, dodecyl amine, tetradecyl amine, hexadecyl amine, octadecylamine, oleyl amine, as well as substitution products of these amines.

The aromatic disulphonic acid utilized in the production of my new bodies is preferably employed in the form of the aromatic disulphonyl chloride by which term I contemplate the benzene disulphonyl dichloride, the biphenylene disulphonyl chloride, the naphthylene disulphonyl chloride, the anthrylene disulphonyl chloride, etc. These aromatic groups may contain additional substituents such as alkyl, aryl or aralkyl or halogens particularly chlorine. The following example will illustrate preparation of an alkyl diamide of biphenyl disulphonic acid. For the preparation of this body I add say 18.4 grams 4,4′ biphenyl disulphonyl chloride to 44 grams of lauryl amine, $C_{12}H_{25}NH_2$. The temperature rises to 130° C. and hydrochloric acid gas is evolved. When the evolution of hydrochloric acid gas has ceased the product is boiled with water, made alkaline with caustic soda and filtered. The product is then washed with alcohol, recrystallized from xylene and dried at 110° C. in a vacuum oven for say 24 hours. An 82% yield of a white crystalline material melting at 192° C. was obtained. This compound is N,N′ dilauryl p,p′ biphenyl disulphonamide. It may also be referred to as bis(p phenyl-N-lauryl sulphonamide).

The herein described compounds are especially valuable for application to the various textile fibers or fibrous products, namely, fabrics woven from cotton, linen, wool, jute, artificial silk, yarns and the like, for the purpose of producing waterproof products. These compounds may also be applied to paper forming fibers such as sulphate, sulphite and ground wood pulp or to paper itself. The application to such paper forming fibers is preferably done in the beater or Jordan machine wherein the herein described alkyl diamide is dispersed mechanically or by combinations of mechanical and chemical dispersing agents.

Since the alkyl diamides herein described are water insoluble powders of pronounced hydrophobic properties, it is preferred for the application of these substances to fibrous products for the purpose of developing water repellency, to first prepare aqueous dispersions by very intimately comminuting the product in the presence of water or other dispersing media. While such dispersions can be prepared mechanically, their preparation is somewhat easier if the alkyl diamide is dispersed in the presence of chemical dispersing agents. Such chemical dispersing agents suitable for preparation of dispersions of the present compounds are the following: copolymers of styrene and maleic anhydride, which copolymers have been converted to their water soluble salts, i. e., sodium or ammonium salts, organic amine or ammonium salts of alkyl aryl phosphinic acids, glyceryl sulphoricinoleate, butyl hydroxy diphenyl sulphonate or the N (para sodium sulpho phenyl imino methylene) stearamide.

The invention is illustrated but not limited by the following example.

Example

A dispersion of 4 grams of alkyl diamide biphenyl disulphonic acid having a melting point in the neighborhood of 192° C., 2 grams of a water soluble salt such as the ammonium salt of the styrene maleic anhydride copolymer in 400 grams of water is prepared in a mechanical dispersing apparatus. A sample of Indian Head cloth is treated in the suspension contained in a padding machine while the temperature of the dispersion solution is in the neighborhood of 45° C. The treated cloth is wrung out and then dried by heating it to a temperature above 192° C., i. e., above the melting point of the diamide. The treated cloth will be found to have a permanent wash resistant, water repellent property and a good feel.

Fabrics treated by the herein described process may be evaluated as to water repellency by two tests generally applied by those skilled in the art. These tests are known as the "Spray test" and as the "Hydrostatic head test." The spray test which I employ is described in the American Dyestuffs Reporter, vol. 28, page 285 for 1939. The hydrostatic head test is described in the 1940 Yearbook of the American Association of Textile Chemists and Colorists at pages 223–4.

A sample of Indian Head cloth treated as above described with the lauryl diamide of biphenyl disulphonic acid showed the following degree of water proofness. Tested with the spray test above referred to, I obtain a moisture absorption of 9.2% and a hydrostatic head value of 15.5 cm. I then subject my treated fabric to 20 consecutive washings with soap and warm water and thereafter I obtained a spray test value of 34% moisture absorption and a hydrostatic head value of 9.1 cm., which values indicates good wash resistance. The alkyl diamide may also be applied to textile products either woven or knitted from the synthetic linear condensation polyamide yarns, such as the polyhexa methylene adipamide, for the purpose of increasing the water repellent properties thereof. Or it may be dispersed in the polymer or in solutions of the polymer prior to the spinning of such materials. Likewise, the present compounds may be incorporated into the synthetic textile fiber forming derivative such as cellulose acetate, nitrate, viscose and in each case improved water resistance may thereby be obtained.

My present compounds are of pronounced heat stability and I may accordingly make dispersions thereof by melting such compounds and then dispersing the molten compound in water, in the presence of dispersing agents, by the use of high speed agitators, homogenizers, etc.

Relatively dilute solutions of the dispersions, say from .2% to 1%, or even 4% or 5% may be employed for the application of the diamide to the cloth. Even more concentrated dispersions say up to 40% or 50% may be advantageously prepared, especially with the aid of chemical dispersing agents, and the concentrated dispersions may then be diluted to a satisfactorily usable dilution prior to application to textile fabrics. In general suitable treating solutions may contain an amount of dispersing acid ranging from 1% to 10% or more by weight of the diamide. Such aqueous dispersions may conveniently be marketed directly as dispersions either in concentrated form or in dilute form ready for application to textiles. It is also practical to market the dry powdered diamide as such, either in the pure form or having mixed therewith any of the dispersion agents above mentioned in dry form or the dry powdered diamide may, prior to drying be treated with solutions of the dispersing agent and then dried to obtain a dry powder of the diamide upon the particles of which is coated the dispersing agent.

What I claim is:

1. The process of imparting water repellent properties to fibrous products comprising treating said fibrous products with a compound of the formula:

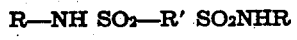

R—NH SO$_2$—R′ SO$_2$NHR where R is a long chain aliphatic residue having a carbon chain of from C$_8$ to C$_{28}$ inclusive, and R′ is an aromatic residue.

2. The process of imparting water repellent properties to fibrous products comprising forming a disperse phase comprising the compound:

R—NH SO$_2$—R′—SO$_2$—NHR where R is a long chain aliphatic residue having a carbon chain length of from C$_8$ to C$_{28}$ inclusive, and R′ is an aromatic residue, in a dispersing medium and treating fibrous products therewith.

3. The process defined in claim 2 in which the aliphatic residue is a lauryl residue.

4. The process defined in claim 2 in which the aromatic residue is the biphenylene residue.

5. Fibrous products associated with a hydrophobic body of the formula:

R—NH SO$_2$—R′—SO$_2$—NHR where R is a long chain aliphatic residue having a carbon chain length of from C$_8$ to C$_{28}$ inclusive, and R′ is an aromatic residue.

6. The product defined in claim 5 in which the aromatic residue R′ is selected from the class consisting of phenyl, biphenyl, naphthyl, anthryl, and phenanthryl.

7. The process of imparting water repellent properties to fibrous products comprising forming a disperse phase comprising the compound:

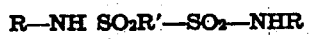

R—NH SO$_2$R′—SO$_2$—NHR where R is a long chain aliphatic residue having a carbon chain length of from C$_8$ to C$_{28}$ inclusive and R′ is an aromatic residue, in a dispersing medium containing a dispersing agent, and treating fibrous products therewith.

8. A textile treating composition comprising an aqueous dispersion of:

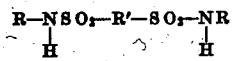

$$R-\underset{H}{N}SO_2-R'-\underset{H}{S}O_2-NR$$

where R is a long chain aliphatic residue having a carbon chain length of from C$_8$ to C$_{28}$ inclusive and R′ is an aromatic residue.

DAVID AELONY.